(12) United States Patent
Nakamura et al.

(10) Patent No.: US 6,836,457 B2
(45) Date of Patent: Dec. 28, 2004

(54) INFORMATION REPRODUCING METHOD AND INFORMATION REPRODUCING DEVICE

(75) Inventors: Tadashi Nakamura, Katano (JP); Yasumori Hino, Ikoma (JP); Norio Miyatake, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/385,881

(22) Filed: Mar. 11, 2003

(65) Prior Publication Data

US 2003/0174608 A1 Sep. 18, 2003

Related U.S. Application Data

(63) Continuation of application No. 09/457,813, filed on Dec. 9, 1999, now Pat. No. 6,587,407.

(30) Foreign Application Priority Data

Dec. 16, 1998 (JP) .......................................... 10-357848

(51) Int. Cl.[7] .............................................. G11B 5/09
(52) U.S. Cl. ..................................... 369/59.22; 360/65
(58) Field of Search .......................... 369/59.21, 59.22, 369/59.27, 124.04, 124.05, 124.07, 124.09, 47.18, 47.19, 47.2, 124.11, 124.12, 59.19, 59.25, 47.14, 47.27, 47.32, 47.35, 47.26; 360/65; 375/232, 233

(56) References Cited

U.S. PATENT DOCUMENTS

| | | | | |
|---|---|---|---|---|
| 4,931,973 A | * | 6/1990 | Asghar et al. .............. 708/319 |
| 4,947,362 A | * | 8/1990 | Bui .............................. 708/322 |
| 5,166,914 A | | 11/1992 | Shimada et al. |
| 5,414,571 A | * | 5/1995 | Matsushige et al. .......... 360/65 |
| 5,606,464 A | * | 2/1997 | Agazzi et al. ................ 360/65 |
| 5,623,474 A | | 4/1997 | Oshio et al. |
| 5,677,802 A | | 10/1997 | Saiki et al. |
| 5,808,988 A | | 9/1998 | Maeda et al. |
| 5,870,372 A | * | 2/1999 | Kuribayashi ............. 369/53.19 |
| 6,064,536 A | * | 5/2000 | Ebisawa et al. .............. 360/65 |
| 6,295,316 B1 | * | 9/2001 | Tonami et al. .............. 375/230 |

FOREIGN PATENT DOCUMENTS

| | | |
|---|---|---|
| JP | 63-304427 | 12/1988 |
| JP | 5-314653 | 11/1993 |
| JP | 9-7301 | 1/1997 |

* cited by examiner

Primary Examiner—Thang V. Tran
(74) Attorney, Agent, or Firm—Merchant & Gould P.C.

(57) ABSTRACT

An information reproducing device for reproducing digital signals with an optical head from an optical disk includes a first equalizer for waveform-equalizing a reproduction signal, an adaptive learning device for renewing the equalization properties of the first waveform equalizer with an adaptation algorithm, a memory for storing a reproduction signal, a second waveform equalizer that reads signals from the memory and performs waveform equalization after an adaptive learning operation for the first waveform equalizer has been terminated, and a demodulator for demodulating the output of the second waveform equalizer. Thus, adaptive equalization processing can be performed with constantly superior equalization properties and without sacrificing data capacity.

2 Claims, 14 Drawing Sheets

(a)

(b)

INFORMATION REPRODUCING METHOD AND INFORMATION REPRODUCING DEVICE

FIELD OF THE INVENTION

The present invention relates to an information reproducing method and an information reproducing device, in particular to an information reproducing method and an information reproducing device that can perform adaptive equalization of digital signals reproduced from an information recording medium with favorable equalization properties without sacrificing information storage capacities.

BACKGROUND OF THE INVENTION

When digital signals are reproduced from information recording media, such as optical disks, waveform equalization is used for the suppression of interference between symbols, which can negatively affect the symbol error rate, and for the realization of partial response technology, which improves the symbol error rate by generating a specified interference between symbols.

Because property variations of the transmission path are caused by the slightly varying properties of each information recording medium, adaptive equalization technology is used, which updates the equalization properties of the waveform equalizer to adapt to the changes of the transmission path properties.

An example of adaptive equalization technology, which is explained in the prior art section of Publication of Unexamined Japanese Patent Application No. H9-7031, is a technique in which a special learning region is provided on the information recording medium, the learning region is reproduced before the reproduction of the data region, and the generation of the reproduction clock and adaptive learning processing are performed using the resulting signal.

FIG. 12 shows an optical disk reproducing device employing this conventional adaptive equalization technology. Moreover, FIG. 13 shows the sector configuration of the optical disk in FIG. 12.

The sector 1010 shown in FIG. 13 is a recording unit when digital information is to be recorded on an information recording medium, and consists of an address portion 1001 and a data portion 1002.

The address portion 1001 indicates the physical location of the sector 1010, and is prerecorded at the time the optical disk is manufactured.

The data portion 1002 is the region where the user records information, and includes a VFO region 1003, an adaptive learning region 1004, and a data region 1005.

The VFO region 1003 is a continuous data pattern that is provided to precisely generate the reproduction clock necessary at the time of signal reproduction, and the reproduction clock generator 130 in FIG. 12 generates the reproduction clock using the reproduction signal from this pattern.

FIG. 14 shows the configuration of the reproduction clock generator. As shown in FIG. 14, a comparator 131 compares the reproduction signal with a predetermined slice level, and detects its zero crossing point. A VCO 134 oscillates at a frequency proportional to the input voltage, and is the oscillator for outputting the reproduction clock signal. A phase comparator 132 compares the timing of the zero crossing of the reproduction signal with the timing of the edge of the reproduction clock signal outputted by VCO 134, and outputs a pulse whose width is proportional to the phase error determined by the phase comparator. A low-pass filter (LPF) 133 lets only low frequency components outputted by the phase comparator 132 pass, and feeds this output to the VCO 134.

With this configuration, a reproduction clock can be generated that depends on the variations of the disk's rotation speed, because when the output voltage of the phase comparator 132 changes in accordance with the phase difference, the VCO 134 changes its oscillator frequency accordingly.

In the adaptive learning region 1004, a known bit pattern is recorded for performing an adaptation learning process, which updates the equalization properties of the waveform equalizer 107. The equalization error is determined by determining the difference between the digital reproduction signal attained by reproducing this bit pattern and an equalization target value uniquely set for each bit pattern. Adaptive learning processing is performed by determining, in an adaptation algorithm, the equalization property values of the waveform equalizer 107 minimizing this equalization error.

With an optical disk having such a sector configuration, the optical disk reproducing device in FIG. 12 first of all accesses the sector 1010, in accordance with the information recorded in the address portion 1001.

If the access to the target sector 1010 is successful, the VFO region 1003 is reproduced by the optical head 103, the reproduction clock generator 130 generates the reproduction clock based on this reproduced signal, and the reproduction clock is then fed to various parts of the optical disk reproducing device.

Then, the optical head 103 reproduces the adaptive learning region 1004, and this reproduced signal is A/D converted in synchronization with the regeneration clock, thereby obtaining the digital reproduction signal. The obtained digital reproduction signal is fed to the waveform equalizer 107 and the adaptive learning device 108.

The waveform equalizer 107 performs waveform equalization, and the adaptive learning device 108 adjusts the waveform equalizer 107 to appropriate equalization properties by performing adaptive learning processing.

After the adaptive learning is finished, the data region 1005 is reproduced, and after the waveform has been equalized with the waveform equalizer 107, it is demodulated with a demodulator 111.

With this processing, it is possible to synchronize the reproduction time of the data region constantly with the reproduction clock, and to perform waveform equalization with equalization properties commensurate with the properties of the transmission path.

However, in the adaptive equalization processing with this conventional information reproducing device, VFO regions and adaptive learning regions, which cannot store user data, have to be provided to obtain good reproduction properties. As a result, some of the limited data capacity of the information recording medium has to be sacrificed.

To avoid sacrificing data capacity, methods without adaptive learning regions have been proposed, which determine a prediction equalization error by presupposing the reproduction signal with a certain threshold as a reference, and perform an adaptive learning operation to reduce this prediction equalization error. But with this structure, the performance of the adaptive learning is worse than if known data on the adaptive learning region are reproduced to determine a precise equalization error.

In particular, in the initial stage of the adaptive learning, there is no guarantee that the equalization properties of the waveform equalizer are suited to the transmission path of the circuit. In such a case, the prediction equalization error is wrong, and as a result, the convergence speed of the adaptive learning decreases, and in the worst case may even diverge.

Moreover, in the case of an information reproduction medium such as an optical disk reproducing device, when defocussing or variations of the disk reflectivity, or level variations in the reproduction signal waveform due to power variations of the laser occur, then the position of the zero crossing point output by the comparator 131 strays from its initial position, and the VCO 134 cannot generate a precise reproduction clock.

When no precise reproduction clock can be supplied, the timing of the sampling of the reproduction signal performed by the A/D converter 106 in FIG. 12 becomes off, and the signal level of the digital reproduction signal obtained as the output of the A/D converter 106 varies. As a result, the properties of the adaptive learning process performed with the digital reproduction signal deteriorate, and it becomes difficult to perform suitable waveform equalization.

Moreover, in the adaptive learning processing with a conventional information reproducing device, the reproduction signals from the adaptive learning region all are used for adaptive learning, but when the signal level of the reproduction signal strays widely from an equalization target value due to, for example, defects on the surface of the information recording medium, the resulting equalization error itself is wrong, and it becomes impossible to determine the correct equalization property value.

SUMMARY OF THE INVENTION

It is an object of the present invention to solve the above-noted problems of the prior art, and to provide an information reproduction method and an information reproducing device that can perform adaptive equalization processing with constantly good equalization properties, without sacrificing data capacity.

To achieve this object, a first information reproduction method of the present invention for reproducing digital signals with a reproduction head from an information recording medium comprises storing a reproduction signal in a memory and waveform-equalizing the reproduction signal with a first waveform equalizer; performing an adaptive learning operation, in which an adaptive learning device renews equalization properties of the first waveform equalizer with an adaptation algorithm; after the adaptive learning operation with the first waveform equalizer, setting the equalization properties of a second waveform equalizer to the equalization properties of the first waveform equalizer; reading out a signal from the memory and waveform-equalizing the signal with the second waveform equalizer; and demodulating the output of the second waveform equalizer with a demodulator. With this first information reproduction method, digital reproduction signals are stored temporarily in the memory, while adaptive learning is performed with the reproduction signal from the data region, and after suitable equalization property values have been determined by the adaptive learning, the data stored in the memory is read out and waveform-equalized, so that it becomes possible to perform waveform equalization of reproduction signals with constantly good equalization properties, even without providing special learning regions on the information storage medium.

In the first information reproduction method of the present invention, it is preferable that the second waveform equalizer is the first waveform equalizer, having terminated the adaptive learning operation. With this configuration, it is possible to perform waveform equalization of reproduction signals with constantly good equalization properties, without providing a plurality of waveform equalizers and without providing special learning regions on the information storage medium.

Moreover, in the first information reproduction method of the present invention, it is preferable that the memory is a FIFO memory. With this configuration, it becomes possible to read out the temporarily stored digital reproduction signals with a simple structure.

Moreover, in the first information reproduction method of the present invention, it is preferable that the information recording medium has a sector structure, and when the adaptive learning operation begins, the first waveform equalizer is set to predetermined equalization properties. With this configuration, the adaptive learning operation can be begun from suitable initial conditions depending on the reproduced sector position, and it becomes possible to reduce the possibility of a reproduction failure. Furthermore, in this case, it is preferable that the first waveform equalizer is set to equalization properties different from preceding equalization properties if a sector is reproduced where a reproduction error has occurred at the preceding reproduction time. With this configuration, it becomes possible to reduce the possibility of a reproduction failure.

Moreover, it is preferable that the first information reproduction method of the present invention further comprises using, as the information recording medium, an information recording medium on which clock pits are prerecorded that are used for deriving a reproduction clock; outputting a clock pit detection signal by detecting the clock pits from the reproduction signal with a clock pit detector; generating a reproduction clock with a reproduction clock generator from the clock pit detection signal; performing the adaptive learning operation, in which the adaptive learning device renews equalization properties of the first waveform equalizer with an adaptation algorithm, in synchronization with the reproduction clock. With this configuration, superior adaptive learning results can be attained, even when there are level variations in the reproduction signal. Moreover, the VFO regions that used to be necessary in the prior art become unnecessary, and it becomes possible to increase the capacity of the user data.

Moreover, it is preferable that the first information reproduction method of the present invention further comprises detecting with a defect detector, from the reproduction signal, a signal portion reproducing a defect portion on a surface of the information recording medium and outputting a defect detection signal; and performing the adaptive learning operation with the adaptive learning device, renewing the equalization properties of the first waveform equalizer using an adaptation algorithm while changing an update amount of the equalization properties of the first waveform equalizer in accordance with the defect detection signal. With this configuration, influences of unsuitable reproduction signals from defect areas can be avoided or reduced, which makes it possible to perform a reliable adaptive learning operation.

Moreover, in the first information reproduction method of the present invention, it is preferable that the adaptive learning operation of renewing the equalization properties of the first waveform equalizer with the adaptive learning device is performed using an adaptation algorithm whose precision is higher than the precision of an input signal of the first waveform equalizer. With this configuration, it is possible to perform a reliable adaptive learning operation without bringing about a larger size of the device.

A second information reproduction method of the present invention for reproducing digital signals with a reproduction head from an information recording medium on which clock pits used for deriving a reproduction clock are prerecorded comprises detecting clock pits from a reproduction signal with a clock pit detector and outputting a clock pit detection signal; generating a reproduction clock from the clock pit detection signal with a reproduction clock generator; waveform-equalizing the reproduction signal with a waveform equalizer; performing an adaptive learning operation in which an adaptive learning device renews equalization properties of the waveform equalizer with an adaptation algorithm, in synchronization with the reproduction clock; and demodulating an output of the waveform equalizer with a demodulator. With this second information reproduction method, the problem that the precision of the reproduction clock is damaged by level variations of the reproduction signal can be avoided. Moreover, VFO regions become unnecessary, and the capacity of the user data can be increased.

A third information reproduction method for reproducing digital signals with a reproduction head from an information recording medium comprises waveform-equalizing a reproduction signal with a waveform equalizer; detecting with a defect detector, from the reproduction signal, a signal portion reproducing a defect portion on a surface of the information recording medium and outputting a defect detection signal; performing the adaptive learning operation with an adaptive learning device, renewing the equalization properties of the waveform equalizer using an adaptation algorithm while changing an update amount of the equalization properties in accordance with the defect detection signal; and demodulating an output of the waveform equalizer with a demodulator. With this third information reproduction method, even if during the adaptive learning processing unsuitable data such as reproduction signals from a defect area are input into the adaptive learning device, the influence of such signals can be ignored or made very small, so that it becomes possible to perform a reliable adaptive learning operation.

A fourth information reproduction method of the present invention for reproducing digital signals with a reproduction head from an information recording medium comprises waveform-equalizing a reproduction signal with a waveform equalizer; performing an adaptive learning operation of renewing the equalization properties of the waveform equalizer with an adaptive learning device, using an adaptation algorithm whose precision is higher than the precision of an input signal of the waveform equalizer; and demodulating an output of the waveform equalizer with a demodulator. With this fourth information reproduction method, high precision calculations are performed only inside the adaptive learning device performing the calculation processing of the adaptation algorithm, so that it is possible to perform a reliable adaptive learning operation without bringing about a larger size of the device.

A fifth information reproduction method of the present invention for reproducing digital signals with a reproduction head from an information recording medium comprises storing a reproduction signal in a memory and waveform-equalizing the reproduction signal with first waveform equalization properties; performing an adaptive learning operation in which the first waveform equalization properties are renewed with an adaptation algorithm; after the adaptive learning operation, setting second waveform equalization properties to the first waveform equalization properties; reading out the reproduction signal from the memory and waveform-equalizing it with the second waveform equalization properties; and demodulating the reproduction signal after it has been waveform-equalized with the second waveform equalization properties.

A first information reproducing device of the present invention for reproducing digital signals with a reproduction head from an information recording medium comprises a memory for storing a reproduction signal; a first waveform equalizer for waveform-equalizing the reproduction signal; an adaptive learning device for performing an adaptive learning operation of renewing equalization properties of the first waveform equalizer with an adaptation algorithm; a second waveform equalizer for waveform-equalizing a signal read out from the memory, after the adaptive learning operation has been performed for the first waveform equalizer, and the equalization properties of the first waveform equalizer have been set as the equalization properties of the second waveform equalizer; and a demodulator for demodulating an output of the second waveform equalizer.

In the first information reproducing device of the present invention, it is preferable that the second waveform equalizer is the first waveform equalizer, after it has terminated the adaptive learning operation.

Moreover, in the first information reproducing device of the present invention, it is preferable that the memory is a FIFO memory.

Moreover, in the first information reproducing device of the present invention, it is preferable that the first waveform equalizer is set to predetermined equalization properties when the adaptive learning operation begins. In this case, it is preferable that the information recording medium has a sector structure, and the first waveform equalizer is set to equalization properties that are different from preceding equalization properties when a sector is reproduced that has caused a reproduction error at the preceding reproduction time.

In the first information reproducing device of the present invention, it is preferable that clock pits used for deriving a reproduction clock are prerecorded on the information recording medium; the information reproducing device further comprising a clock pit detector for detecting the clock pits from a reproduction signal and outputting a clock pit detection signal, and a reproduction clock generator for generating a reproduction clock from the clock pit detection signal; and the adaptive learning device renews the equalization properties of the first waveform equalizer in synchronization with the reproduction clock, using an adaptation algorithm.

Furthermore, it is preferable that the first information reproducing device of the present invention further comprises a defect detector for detecting, from the reproduction signal, a signal portion reproducing a defect portion on a surface of the information recording medium and outputting a defect detection signal; that the adaptive learning operation is performed with the adaptive learning device, renewing the equalization properties of the first waveform equalizer using an adaptation algorithm; and that an update amount of the equalization properties is changed in accordance with the defect detection signal.

In the first information reproducing device of the present invention, it is preferable that, when the adaptive learning operation of renewing the equalization properties of the first waveform equalizer is performed with an adaptation algorithm, the calculation processes of the adaptation algorithm are performed with higher precision than the precision of an input signal of the first waveform equalizer.

A second information reproducing device of the present invention for reproducing digital signals with a reproduction head from an information recording medium on which clock pits used for deriving a reproduction clock are prerecorded comprises a clock pit detector for detecting the clock pits from a reproduction signal and outputting a clock pit detection signal; a reproduction clock generator for generating a reproduction clock from the clock pit detection signal; a waveform equalizer for waveform-equalizing the reproduction signal; an adaptive learning device for performing an adaptive learning operation of renewing equalization properties of the waveform equalizer with an adaptation algorithm, in synchronization with the reproduction clock; and a demodulator for demodulating an output of the waveform equalizer.

A third information reproducing device of the present invention for reproducing digital signals with a reproduction head from an information recording medium comprises a waveform equalizer for waveform-equalizing a reproduction signal; a defect detector for detecting, from the reproduction signal, a signal portion reproducing a defect portion on a surface of the information recording medium and outputting a defect detection signal; an adaptive learning device for performing an adaptive learning operation of renewing the equalization properties of the waveform equalizer using an adaptation algorithm and changing an update amount of the equalization properties in accordance with the defect detection signal; and a demodulator for demodulating an output of the waveform equalizer.

A fourth information reproducing device of the present invention for reproducing digital signals with a reproduction head from an information recording medium comprises a waveform equalizer for waveform-equalizing a reproduction signal; an adaptive learning device for performing an adaptive learning operation of renewing the equalization properties of the waveform equalizer using an adaptation algorithm, performing calculation processes of the adaptation algorithm with a precision that is higher than the precision of an input signal of the waveform equalizer; and a demodulator for demodulating an output of the waveform equalizer.

DESCRIPTION OF THE PREFERRED EMBODIMENTS

The following is a more detailed explanation of the present invention with reference to the preferred embodiments.

First Embodiment

Figure 1:
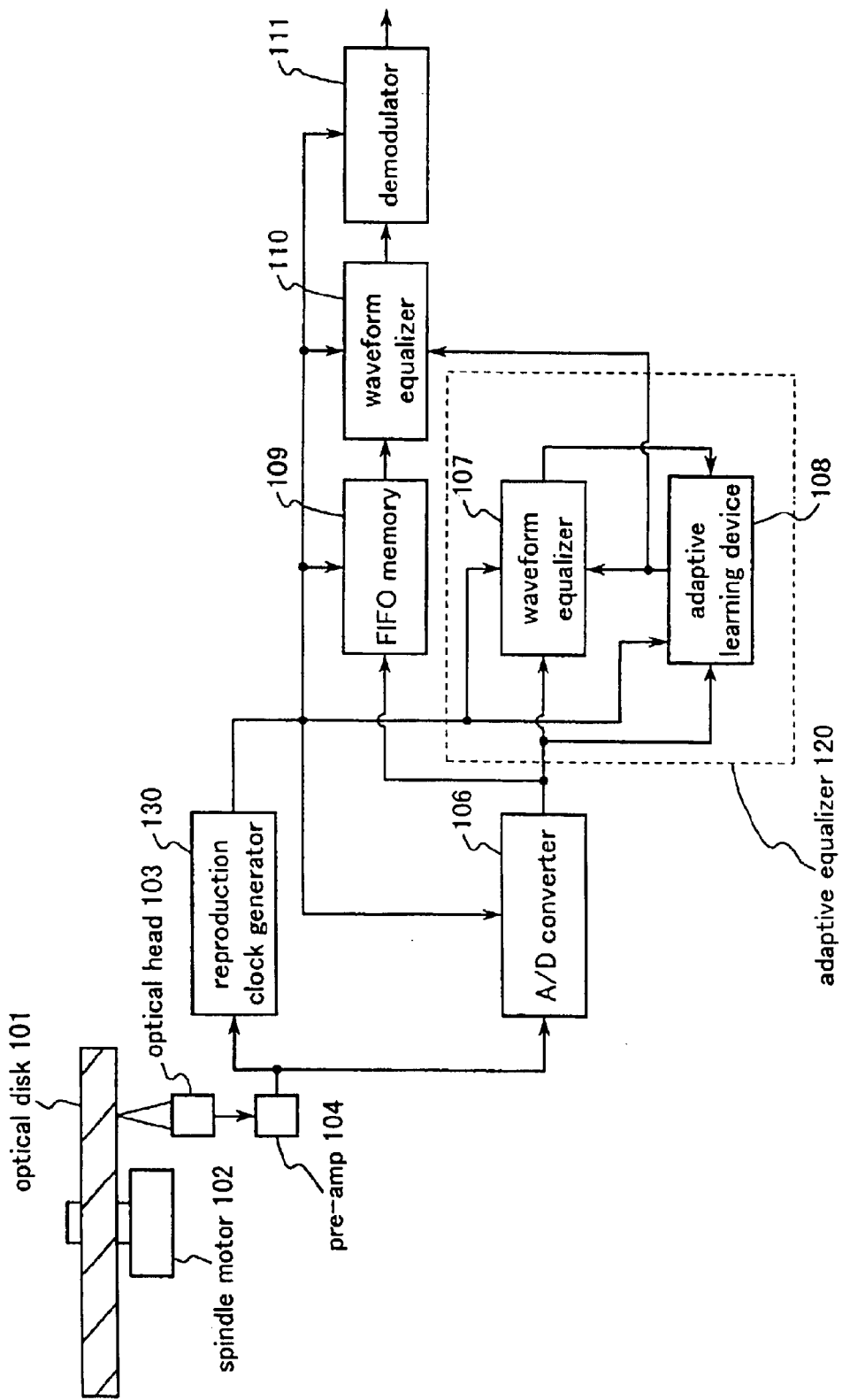
FIG. 1 is a block diagram showing the configuration of an information reproducing device in accordance with a first embodiment of the present invention.

FIG. 1 is a block diagram showing the configuration of an information reproducing device in a first embodiment of the present invention.

Figure 2:
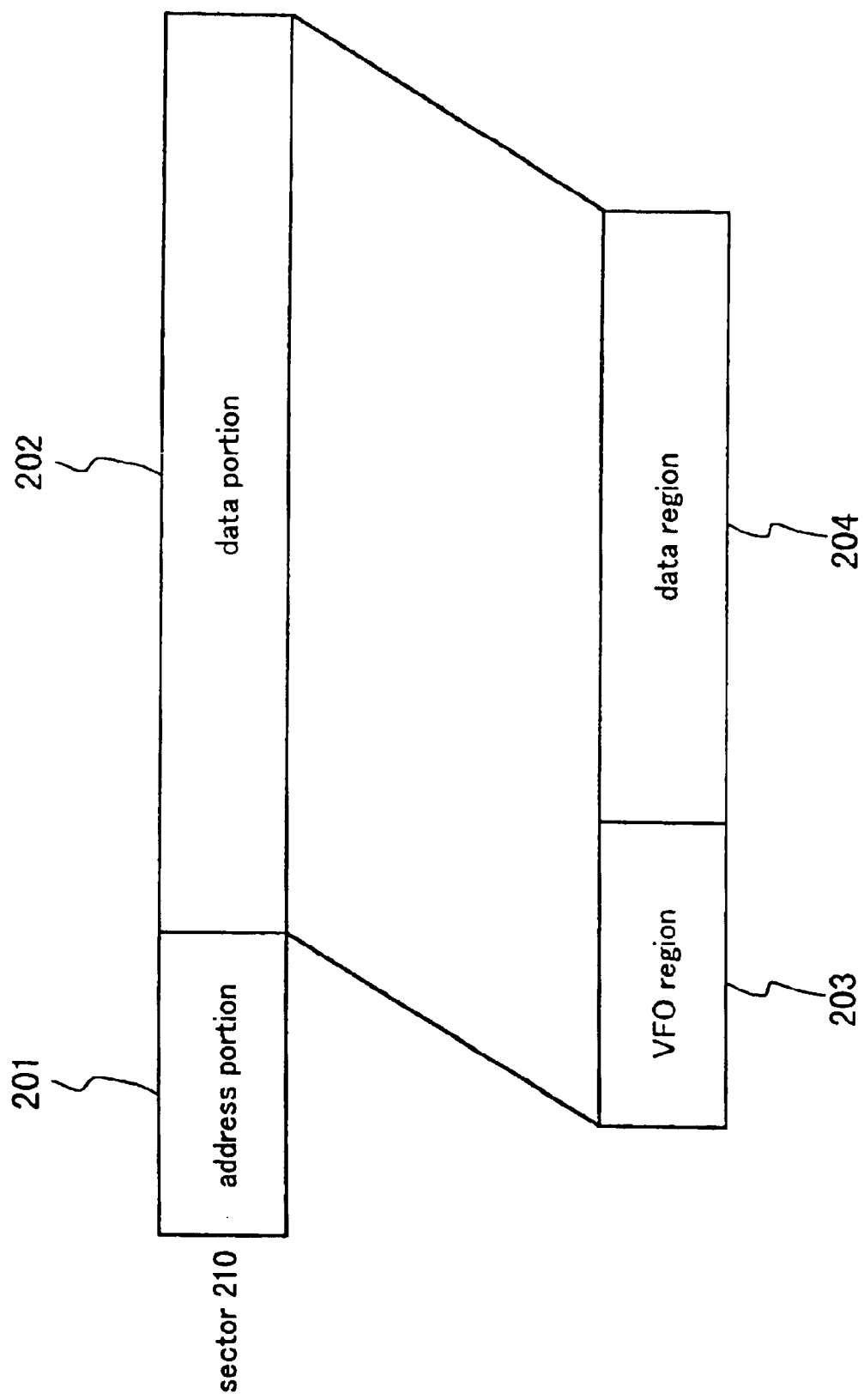
FIG. 2 is a diagram showing the sector structure of the optical disk of FIG. 1.

As shown in FIG. 1, the information reproducing device of this embodiment includes an optical disk 101, which is an information recording medium having the sector structure of FIG. 2, a spindle motor 102 for rotating the optical disk 101, optical irradiation means, e.g. a laser and a converging lens, driving means for focussing and tracking, an optical head 103 for reproducing information from the optical disk 101, a pre-amp 104 for generating e.g. an RF reproduction signal and focussing and tracking error signals from the signal obtained with the optical head 103, a reproduction clock generator 130 for generating a reproduction clock using the reproduction RF signal, an A/D converter 106 for A/D-converting the reproduction RF signal, a waveform equalizer 107, which is an FIR-type transversal filter, for waveform equalization of the output of the A/D converter 106, an adaptive learning device 108 for updating the equalization properties of the waveform equalizer 107 with an adaptive equalization algorithm, a FIFO memory 109 for storing the output of the A/D converter 106, a waveform equalizer 110, which is an FIR-type transversal filter, for waveform equalization of the output of the FIFO memory 109, and a demodulator 111 for demodulating the output of the waveform equalizer 110. In FIG. 1, numeral 120 denotes an adaptive equalizer, which includes the waveform equalizer 107 and the adaptive learning device 108.

FIG. 2 is a diagram showing the sector configuration on the optical disk in FIG. 1. As shown in FIG. 2, a sector 210 comprises an address portion 201 and a data portion 202. Moreover, the data portion 202 includes a VFO region 203 and a data region 204.

Figure 3:
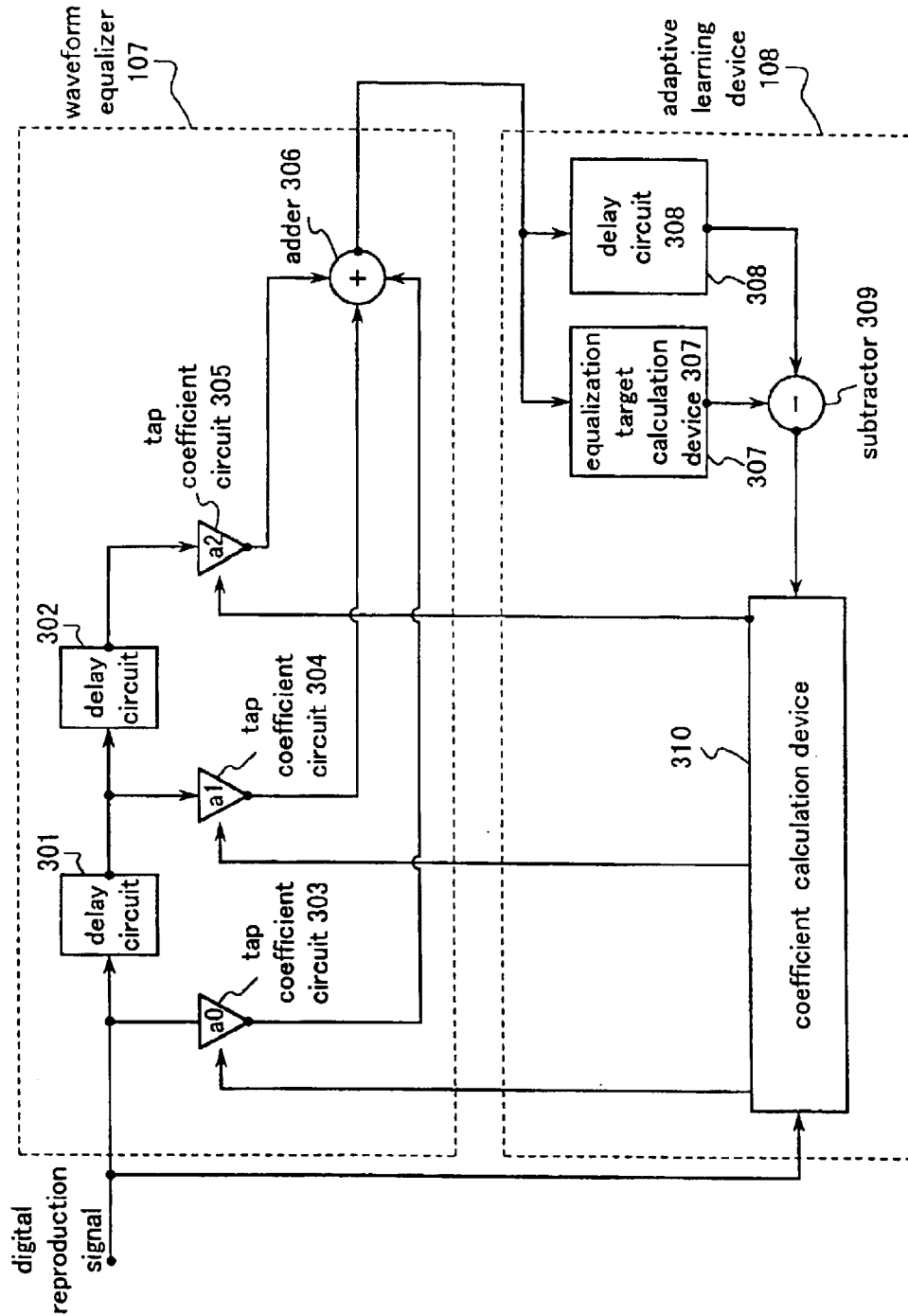
FIG. 3 is a block diagram showing the adaptive equalizer of FIG. 1.

FIG. 3 is a block diagram showing the adaptive equalizer of FIG. 1.

As shown in FIG. 3, the adaptive equalizer 120 includes the waveform equalizer 107 and the adaptive learning device 108. The waveform equalizer 107, which is a FIR-type transversal filter, includes delay circuits 301 and 302, tap coefficient circuits 303, 304 and 305 for multiplying the input and the output of the delay circuits 301 and 302 with the variable tap coefficients a0, a1, and a2, and an adder circuit 306 for adding up the output of the tap coefficient circuits 303, 304 and 305, and outputting the waveform-equalized digital reproduction signal.

The adaptive learning device 108 includes an equalization target calculation device 307, which generates an equalization target signal depending on the signal fed from the waveform equalizer 107, a delay circuit 308 for delaying the signal fed from the waveform equalizer 107 for a time that corresponds to the processing time of the equalization target calculation device 307, a subtractor 309 for subtracting the equalization target signal fed from the equalization target calculation device 307 from the signal fed from the delay circuit 308 to generate an equalization error signal, and a coefficient calculation device 310 for determining new tap coefficients with an adaptation algorithm using the equalization error signal outputted by the subtractor 309 and the digital reproduction signal, to update the tap coefficients for the wave form equalizer 107. The adaptive learning device 108 performs adaptive learning processing, updating the equalization properties of the waveform equalizer 107 using the supplied signals.

In this configuration, when information on the optical disk 101 is reproduced, the optical head 103 reproduces the VFO region 203 and the reproduction clock generator 103 generates a reproduction clock from this reproduction signal. Then, the optical head 103 reproduces the data region 204, and the A/D converter 106 samples the resulting RF reproduction signal in synchronization with the reproduction clock to produce a digital reproduction signal. This digital reproduction signal is fed into the waveform equalizer 107 and the adaptive learning device 108, as well as into the FIFO memory 109, where it is stored. The waveform equalizer 107 equalizes the waveform of the digital reproduction signal, and its output is fed into the adaptive learning device 108. The adaptive learning device 108, using the signals supplied to it, determines new equalization properties for the waveform equalizer 107 with an adaptation algorithm, and updates the tap coefficients a0, a1, and a2 for the waveform equalizer 107. This adaptive learning processing is performed a predetermined number of times within the scope of the capacity of the FIFO memory 109, and after the update processing has been performed a predetermined number of times, the tap coefficients of the waveform equalizer 110 are set to the same tap coefficients as for the waveform equalizer 107. Then, data is read from the FIFO memory 109, and waveform-equalized with the waveform equalizer 110. The output signal of the waveform equalizer 110 is demodulated with the demodulator 111 to obtain demodulated data.

Thus, with this embodiment, while adaptive learning is performed using the reproduction signal from the data region, the digital reproduction signal is held temporarily in the FIFO memory 109, and after appropriate equalization property values have been determined by adaptive learning, the data held in the FIFO memory 109 is read out and waveform equalization is performed, so that even without providing a special learning area on the information recording medium, it is possible to perform waveform equalization of reproduction signals with consistently good equalization properties.

The configurations of the waveform equalizer 107 and the adaptive learning device 108 are not limited to the configurations shown in FIG. 3, and they also can be realized by other methods. Moreover, a FIFO memory 109 was used to hold the digital reproduction signal temporarily, but this embodiment is not necessarily limited to a FIFO memory 109, and also can be realized by other methods.

Moreover, the waveform equalization of signals from the FIFO memory 109 begins after the tap coefficients for the waveform equalizer 107 have been updated for a predetermined number of times, but it is also possible that this number of times is not predetermined, and that the waveform equalization of signals from the FIFO memory 109 begins after a specified condition is satisfied, for example, that the equalization error is smaller than a predetermined value.

Moreover, the processing for setting the waveform equalizer 110 to the tap coefficients of the waveform equalizer 107 is performed directly before starting the waveform equalization of the signals from the FIFO memory 109, but it is also possible to constantly match the values of the tap coefficients of the waveform equalizer 107 and the waveform equalizer 110.

Second Embodiment

Figure 4:
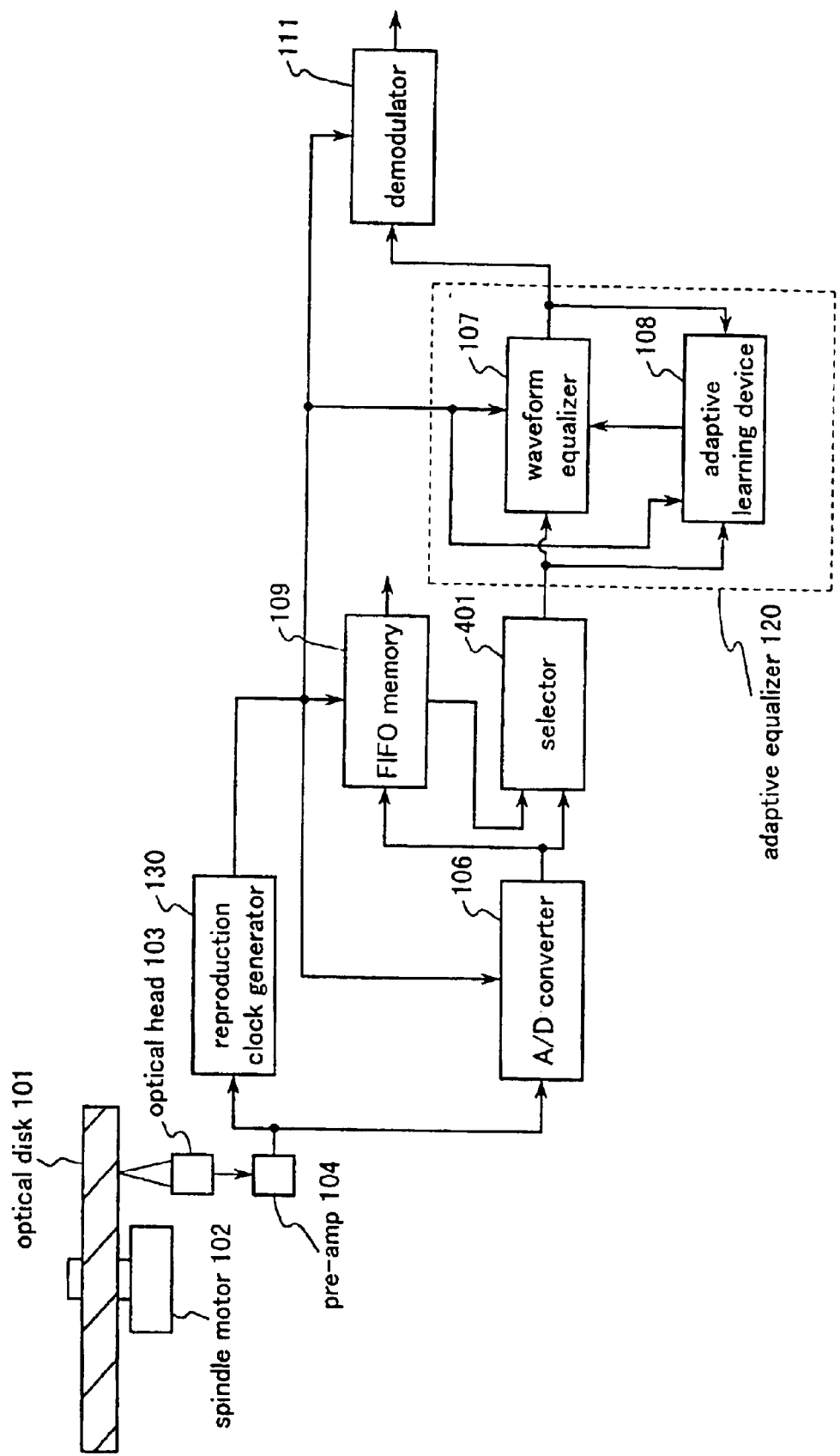
FIG. 4 is a block diagram showing the configuration of an information reproducing device in accordance with a second embodiment of the present invention.

FIG. 4 is a block diagram showing the configuration of an information reproducing device in a second embodiment of the present invention. Regarding elements having the same function as in FIG. 1 of the first embodiment, the same symbols are used and respective explanations have been omitted.

As shown in FIG. 4, an information reproducing device of this embodiment includes an optical disk 101, a spindle motor 102, an optical head 103, a pre-amp 104, a reproduction clock generator 130, an A/D converter 106, a FIFO memory 109, a selector 401 for selecting between the output of the A/D converter 106 and the output of the FIFO memory 109 and outputting the selected output, a waveform equalizer 107 for waveform-equalizing the output of the selector 401, an adaptive learning device 108, and a demodulator 111 for demodulating the output of the waveform equalizer 107.

In this configuration, the generation of the reproduction clock with the VFO regions and the generation of the digital reproduction signal with the A/D converter 106 are performed the same as in the first embodiment, and the output of the A/D converter 106 is fed into the FIFO memory 109 and the selector 401.

When the data region is reproduced, the selector 401 first of all feeds the output of the A/D converter 106 to the waveform equalizer 107. Then, as in the first embodiment, adaptive learning processing is performed a predetermined number of times within the scope of the capacity of the FIFO memory 109, wherein the adaptive learning device 108 updates the equalization properties of the waveform equalizer 107.

After the adaptive learning processing, the selector 401 switches its output to the signal that has been read out from the FIFO memory 109, the waveform equalizer 107 performs waveform equalization, and its output is demodulated by the demodulator 111.

Thus, since this configuration includes a selector 401 for selecting between the output of the A/D converter 106 and the output of the FIFO memory 109 and outputting the selected output, it is possible to perform waveform equalization of reproduction signals always with good equalization properties without providing a plurality of waveform equalizers, and, as in the above-described first embodiment, without providing a special learning area on the information recording medium.

Third Embodiment

Figure 5:
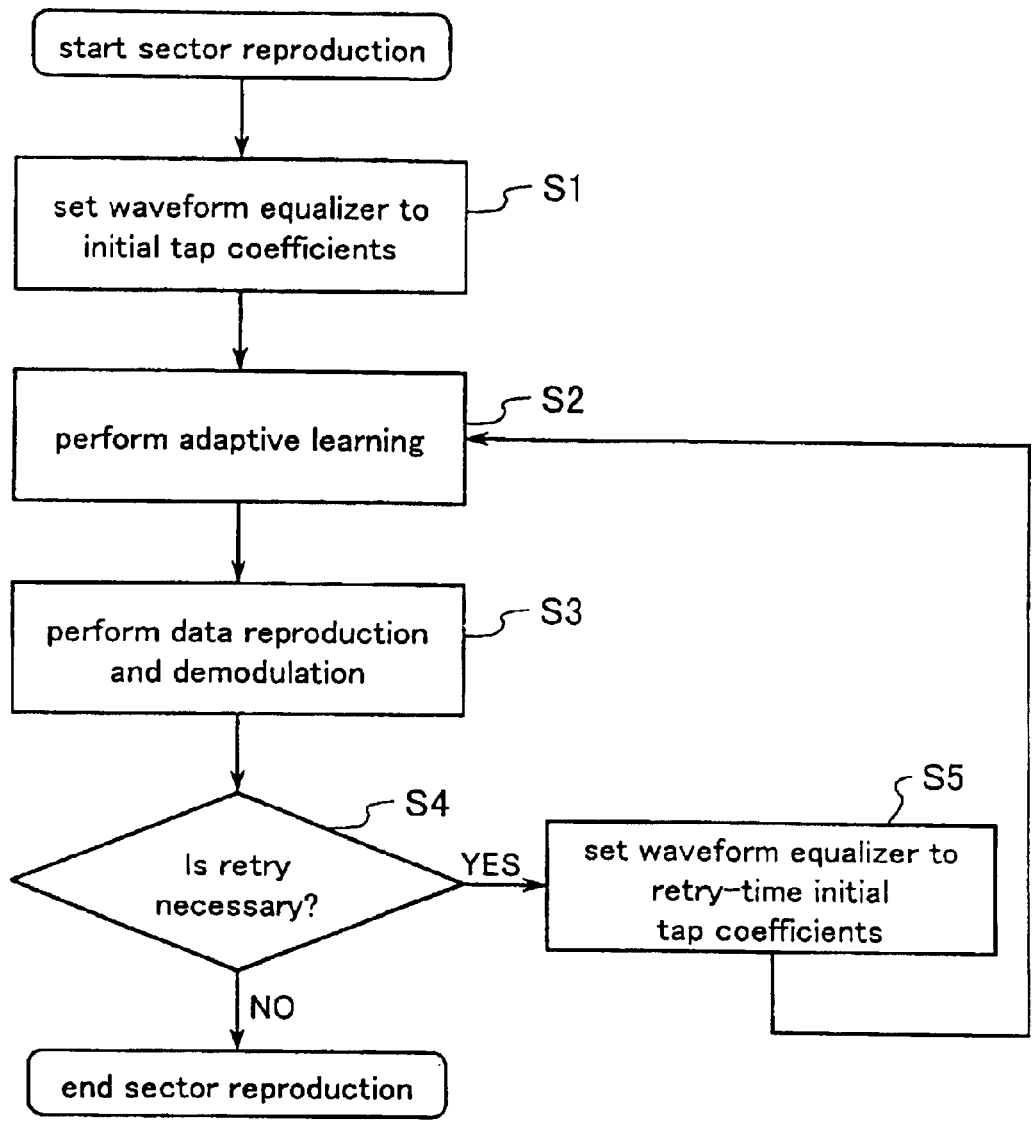
FIG. 5 is a flow chart showing the operation of an information reproducing device in accordance with a third embodiment of the present invention.

FIG. 5 is a flowchart illustrating how an information reproducing device in accordance with a third embodiment of the present invention operates. The configuration of the information reproducing device of this embodiment is the same as that of the first or second embodiment.

In this configuration, when the reproduction sector is accessed and the adaptive learning operation begins, the tap coefficients of the waveform equalizer 107 are set to preset initial tap coefficients (S1).

Under these initial conditions, adaptive learning is performed as explained in the first and the second embodiment (S2), and the reproduction signal is waveform-equalized and demodulated (S3).

Then, it is decided whether it is necessary to perform a reproduction retry (S4), and if there are no errors in the demodulated signal and a retry is not necessary, the reproduction processing is terminated. On the other hand, if the error rate of the demodulated reproduction signals does not fulfill certain criteria, and if there is a need to perform a reproduction retry, the adaptive learning operation is performed again. In this case, the tap coefficients for the waveform equalizer 107 are set to retry-time initial tap coefficients that are different from the above-mentioned initial tap coefficients (S5), and the adaptive learning and the waveform equalization of the data stored in the FIFO memory 109 are performed again.

In this manner, this embodiment can reduce the chances of a retry failure by beginning the adaptive learning during a reproduction retry with initial tap coefficients that are different from the previous ones.

It is also possible to predetermine a plurality of sets of retry-time initial tap coefficients and use different retry-time coefficient tap coefficients for each retry. Moreover, it is also possible to perform the retry not more than a predetermined number of times, and to abort processing if reproduction errors are present beyond that number of times.

Fourth Embodiment

Figure 6:
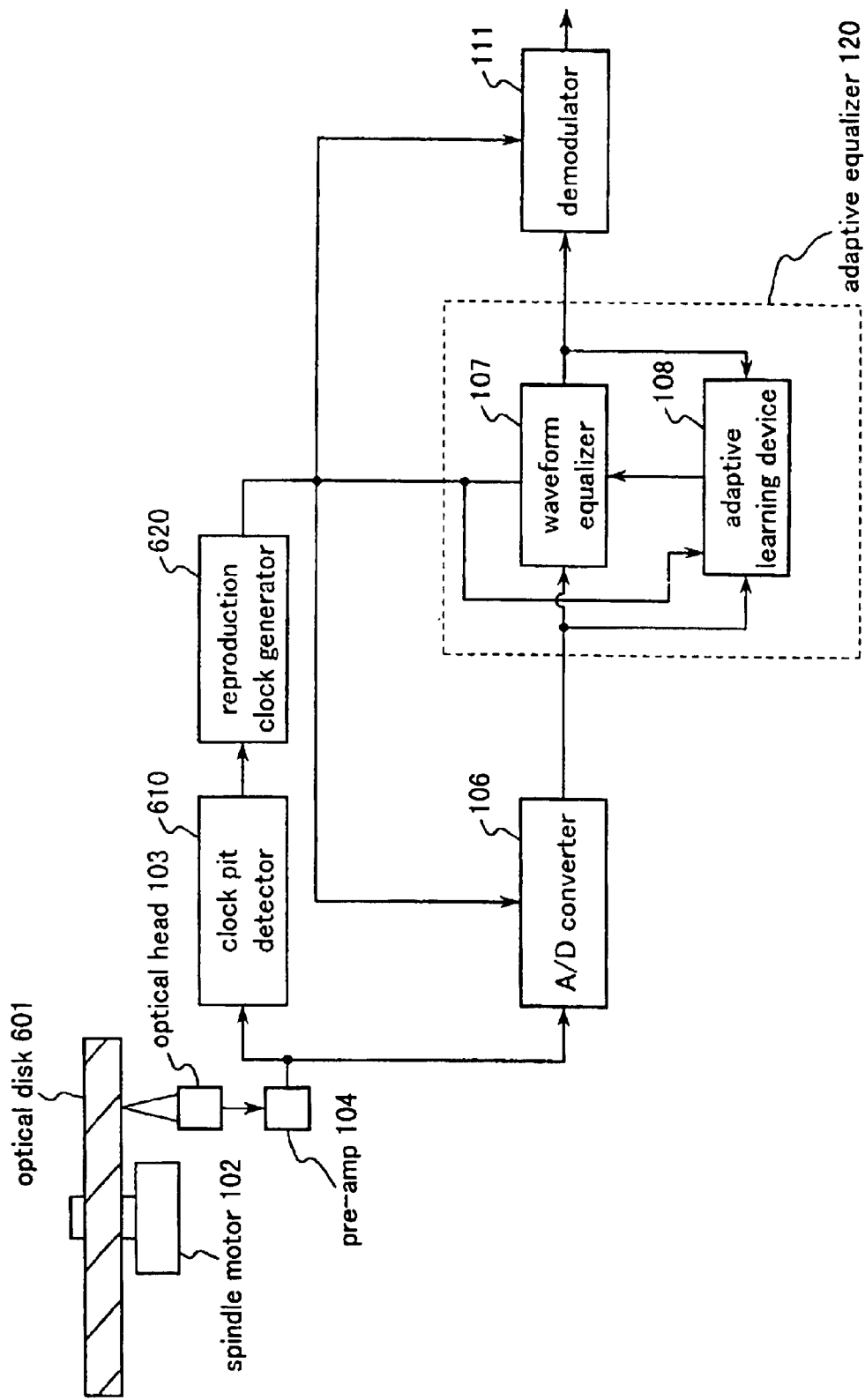
FIG. 6 is a block diagram showing the configuration of an information reproducing device in accordance with a fourth embodiment of the present invention.

FIG. 6 is a block diagram showing the configuration of an information reproducing device in a fourth embodiment of the present invention. Regarding elements having the same function as in FIG. 1 of the first embodiment, the same symbols are used and respective explanations have been omitted.

Figure 7:
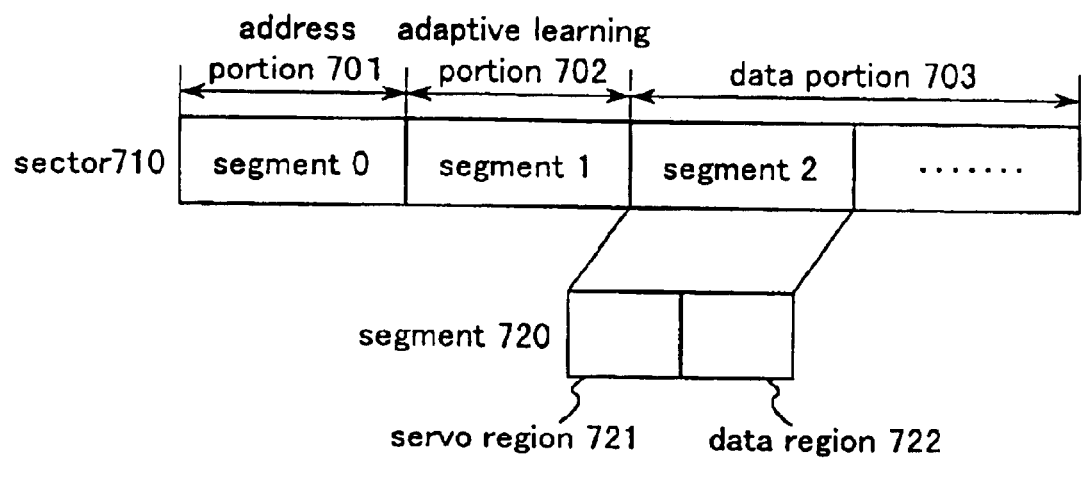
FIG. 7 is a diagram showing the sector structure of the optical disk of FIG. 6.
Figure 7:
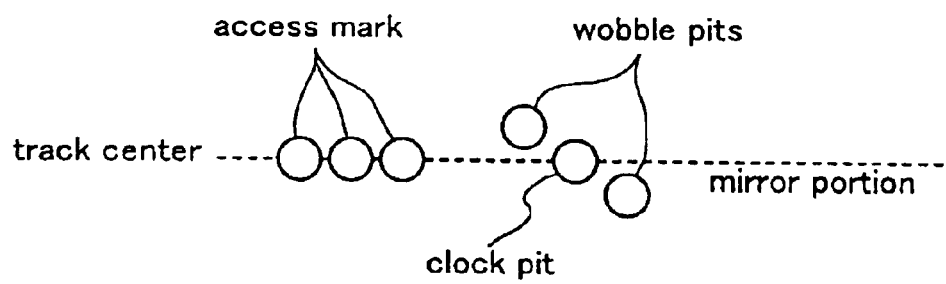

As shown in FIG. 6, an information reproducing device of this embodiment includes an optical disk 601, which is an information recording medium having the sector structure of FIG. 7, a spindle motor 102, an optical head 103, a pre-amp 104, a clock pit detector 610 for detecting a clock pit from a reproduction RF signal and outputting a clock pit detection signal, a reproduction clock generator 620 for generating a reproduction clock based on the clock pit signal, an A/D converter 106, a waveform equalizer 107 for waveform-equalizing the output of the A/D converter 106, an adaptive learning device 108 for updating the equalization properties of the waveform equalizer 107 with an adaptation algorithm, and a demodulator 111 for demodulating the output of the waveform equalizer 107.

FIG. 7 is a diagram showing the sector configuration of the optical disk in FIG. 6. As shown in FIG. 7(a), the sector 710 comprises a plurality of segments, and each segment 720 includes a servo area 721 and a data area 722. As shown in FIGS. 7(a) and (b), there are six pre-pits in the servo area 721. The first three pre-pits are access marks for attaining a track transversal signal during the seek operation, and the latter three pre-pits are pits for the servo. Among these, the wobble pits are arranged with an off-set with respect to the track center, and are used for tracking. Moreover, a clock pit is arranged in the center and serves as a reference for the reproduction clock generation. Furthermore, at the end of the servo region, there is a mirror region at which no pits at all are recorded, and a singular pattern for detecting the servo region is established by combining this mirror portion with a servo mark, which is explained in the following. Moreover, the lead segment 0 is an address portion 701, which includes a sector mark indicating the lead position of the sector, the next sector 1 is an adaptive learning portion 702, in which known data used for adaptive learning is stored, and the other segments 2 etc. are data portions 703.

Figure 8:
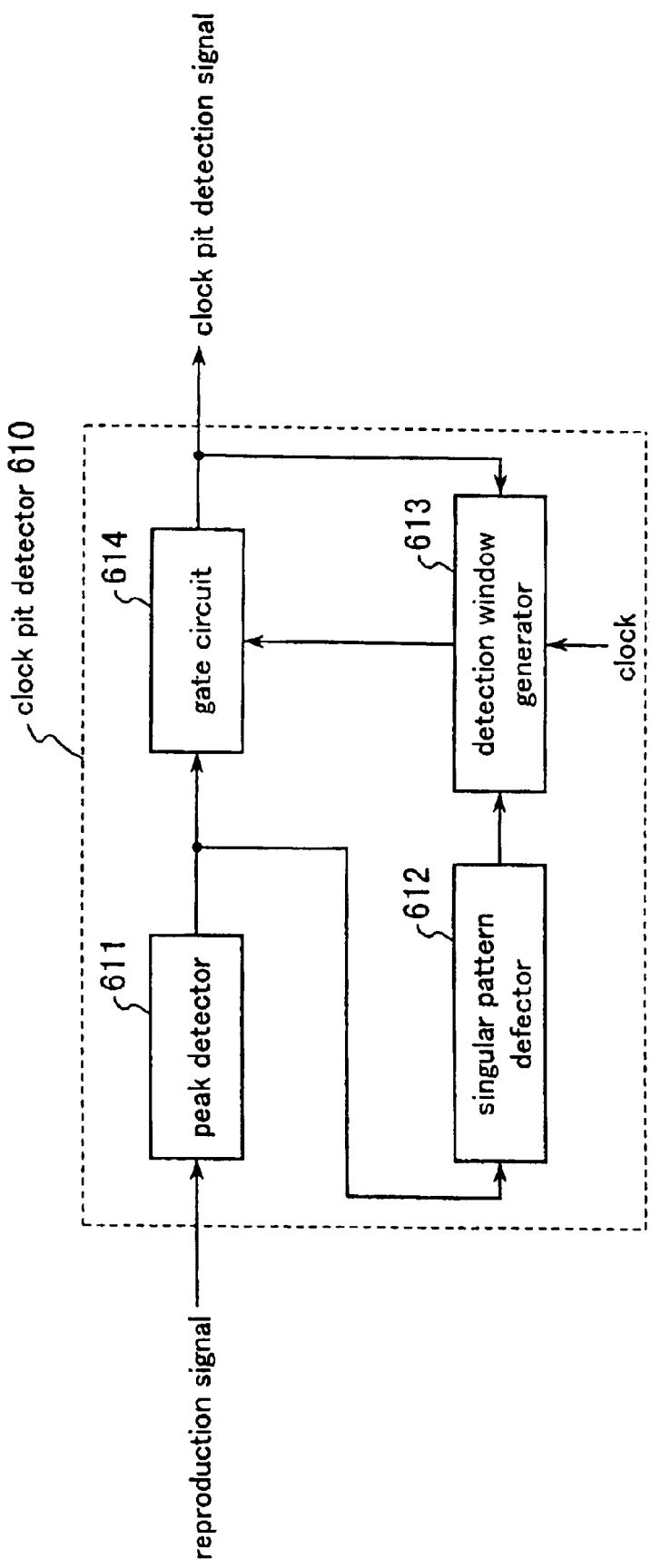
FIG. 8 is a diagram showing the configuration of the clock pit detector in FIG. 6.

FIG. 8 is a drawing showing the structure of the clock pit detector in FIG. 6. As shown in FIG. 8, the clock pit detector 610 includes a peak detector 611 for detecting the peak amplitude of the reproduction signal, a singular pattern detector 612 for detecting the above-mentioned singular pattern, a detection window generator 613 for outputting a constant time detection window starting when the singular pattern detector 612 has detected the servo signal, and a gate circuit 614.

In this configuration, the optical head 103 reproduces the sectors in sequence starting with segment 0, to reproduce the information from the optical disk 601.

The clock pit detector 610 performs the detection of the clock pit from the reproduction signal as follows. The clock pit generator 610 detects the peak position of the reproduction signal with the peak detector 611, and outputs the peak detection signal. The singular pattern detector 612 detects from the peak detection signal a singular pattern that usually does not occur in the reproduction signal. The detection window generator 613 generates a detection window, after the singular pattern has been detected for a specified period of time. Then, the gate circuit 614, to which the peak detection signal and the detection window have been fed, outputs a clock pit detection signal.

The reproduction clock generator 620 generates a reproduction clock based on the supplied clock pit detection signal.

Before the reproduction of the data portion 703, the adaptive learning portion 702 is reproduced, and the resulting reproduction signal is sampled with the A/D converter 106 in synchronization with the reproduction clock, to obtain a digital reproduction signal.

This digital reproduction signal is supplied to the adaptive equalizer 120, where the adaptive learning processing is performed. After the adaptive learning processing, the data portion 703 is reproduced, the adaptive equalizer 120 performs waveform equalization, and its output is demodulated by the demodulator 111.

In this manner, this embodiment generates the reproduction clock by peak-detecting a clock pit that is pre-recorded on the information recording medium. For peak detection, the peak position of the reproduction signal does not change, even if there are level variations of the reproduction signal, so that this embodiment eliminates the problem that existed in conventional technologies, that level variations harm the precision of the regeneration clock, and allows A/D conversion with precise timing as well as better adaptive learning results.

Figure 9:
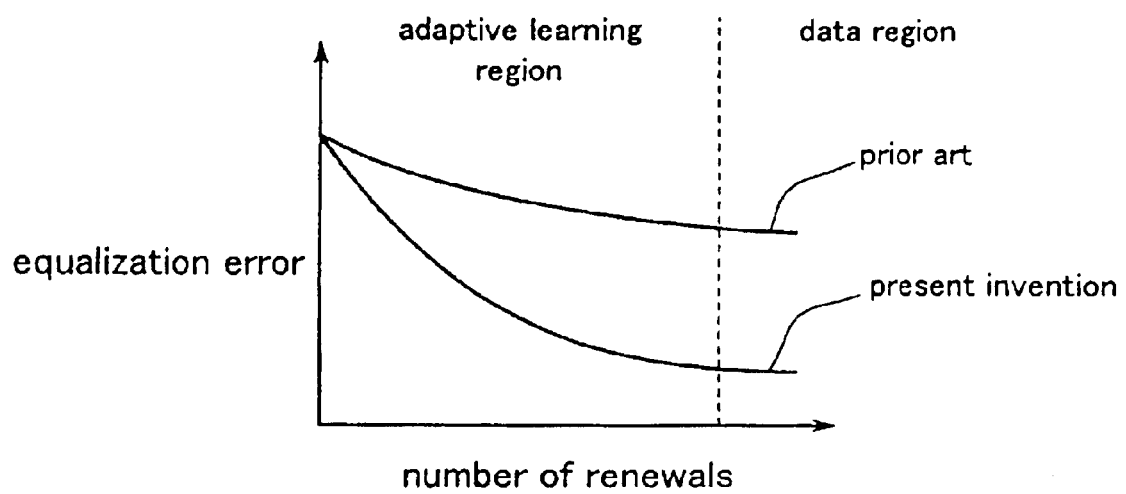
FIG. 9 shows the equalization error as a function of the number of times of renewals for an information reproducing device in accordance with a fourth embodiment of the present invention.

FIG. 9 shows the equalization error as a function of the number of times that the equalization properties of the waveform equalizer 107 have been updated in the adaptive learning region over the course of time. Comparing the equalization errors after reproducing an adaptive learning area of the same length, the equalization error of the present embodiment is lower than that of the prior art, and the reproduction of the data region can be begun with better equalization properties.

Moreover, the reproduction clock is obtained from the clock pits, so that the VFO region, which had to be generated in conventional reproduction clocks, becomes unnecessary, and it becomes possible to increase the volume of user data.

The sector configuration of the optical disk 601 is not limited to the configuration shown in FIG. 7, and also can be realized by other methods, as long as the reproduction clock can be generated from the clock pits.

Fifth Embodiment

Figure 10:
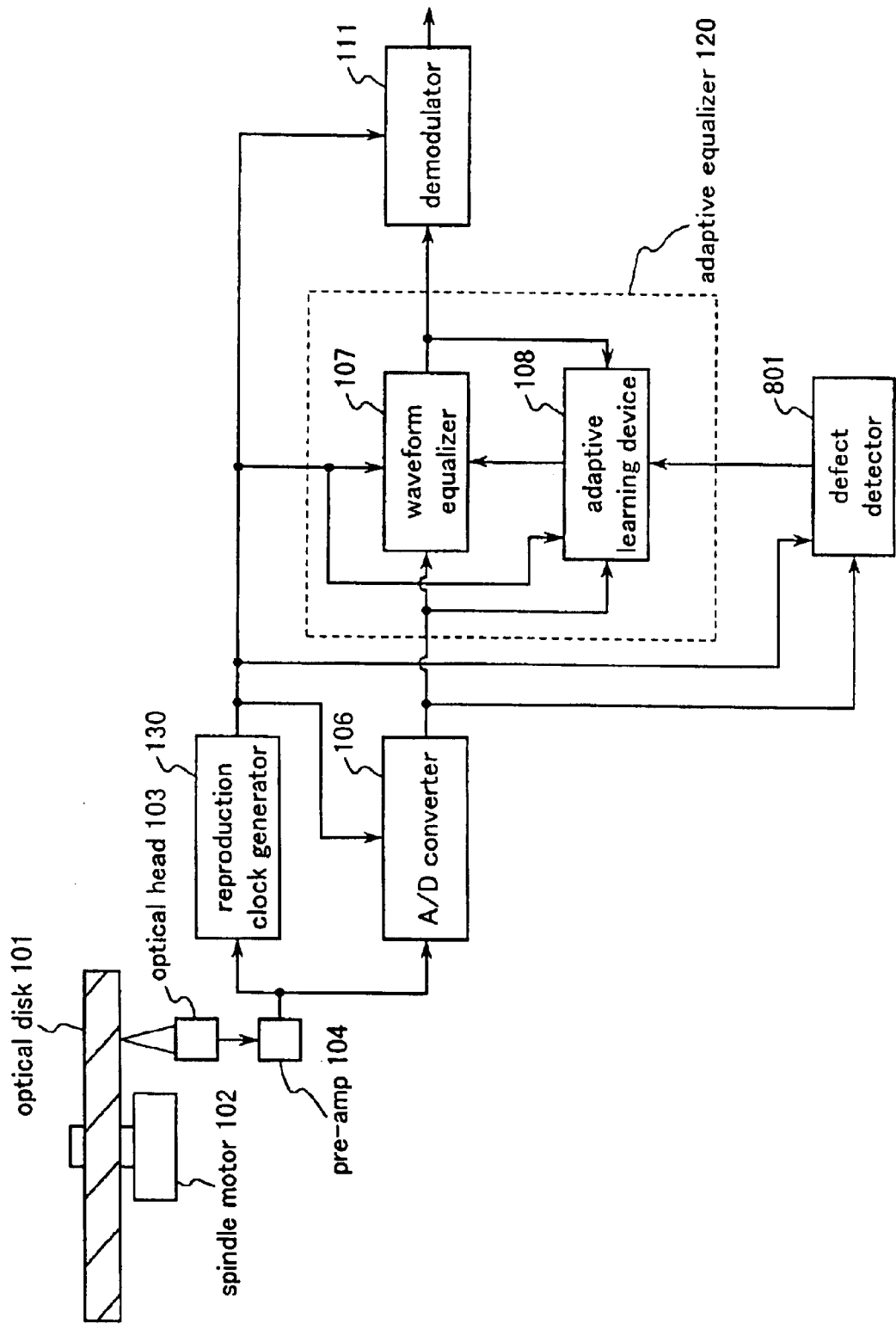
FIG. 10 is a block diagram showing the configuration of an information reproducing device in accordance with a fifth embodiment of the present invention.

FIG. 10 is a block diagram showing the configuration of an information reproducing device in a fifth embodiment of the present invention. Regarding elements having the same function as in FIG. 1 of the first embodiment, the same symbols are used and respective explanations have been omitted.

As shown in FIG. 10, the information recording medium of this embodiment includes an optical disk 101, a spindle motor 102, an optical head 103, a pre-amp 104, a reproduction clock regenerator 130, an A/D converter 106, a defect detector 801 for detecting defects from the output of the A/D converter and outputting a defect detection signal, a waveform equalizer 107 for waveform-equalizing the output of the A/D converter 106, an adaptive learning device 108 for updating the equalization properties of the waveform equalizer 107 with an adaptation algorithm, and a demodulator 111 for demodulating the output of the waveform equalizer 107.

In this embodiment, the generation of the reproduction clock with the reproduction of the VFO region, and the generation of the digital reproduction signal with the A/D converter 106 is performed in the same manner as in the above-noted first embodiment.

The output of the A/D converter 106 is fed into the defect detector 801, the waveform equalizer 107 and the adaptive learning device 108.

The waveform equalizer 107 waveform-equalizes digital reproduction signals. Its output is fed into the demodulator 111 to be demodulated and also into the adaptive learning device 108.

The defect detector 801 detects signals obtained by reproducing defect portions on the optical disk 101 from the supplied digital reproduction signal, and outputs a defect detection signal if it detects a defect portion, which is supplied to the adaptive learning device 108. The defect detector 801 outputs a defect detection signal when the reproduction signal is outside a certain region.

Based on the supplied signals, the adaptive learning device 108 performs adaptive learning processing and updates the equalization properties of the waveform equalizer 107 in synchronization with the reproduction clock, but if a defect detection signal has been supplied to it, the equalization properties of the waveform equalizer 107 are not updated.

Thus, with this embodiment, even when invalid data reproduced from a defect region are inputted to the adaptive learning device 108 during the adaptive learning processing, their influence can be ignored or minimized, so that a stable adaptive learning operation becomes possible.

If a defect detection signal has been supplied, the adaptive learning device 108 does not update the equalization properties of the waveform equalizer 107, but it is also possible to update the equalization properties after performing an operation such as reducing the equalization properties newly determined by the adaptive learning device 108 by a predetermined amount.

Sixth Embodiment

When an update amount for the tap coefficients is determined with an adaptation algorithm such as the least mean square algorithm (referred to as "LMS algorithm" in the following), a calculation is performed where the equalization error is multiplied with a constant, called "step size". In order to obtain the practical adaptive learning properties, it is necessary to set this step size to a sufficiently low value with respect to the amplitude of the input signal. Consequently, if the tap coefficients are calculated to a certain precision, a round-off is performed at the point of the multiplication with the step size, and an error occurs for the newly determined tap coefficients.

Figure 11:
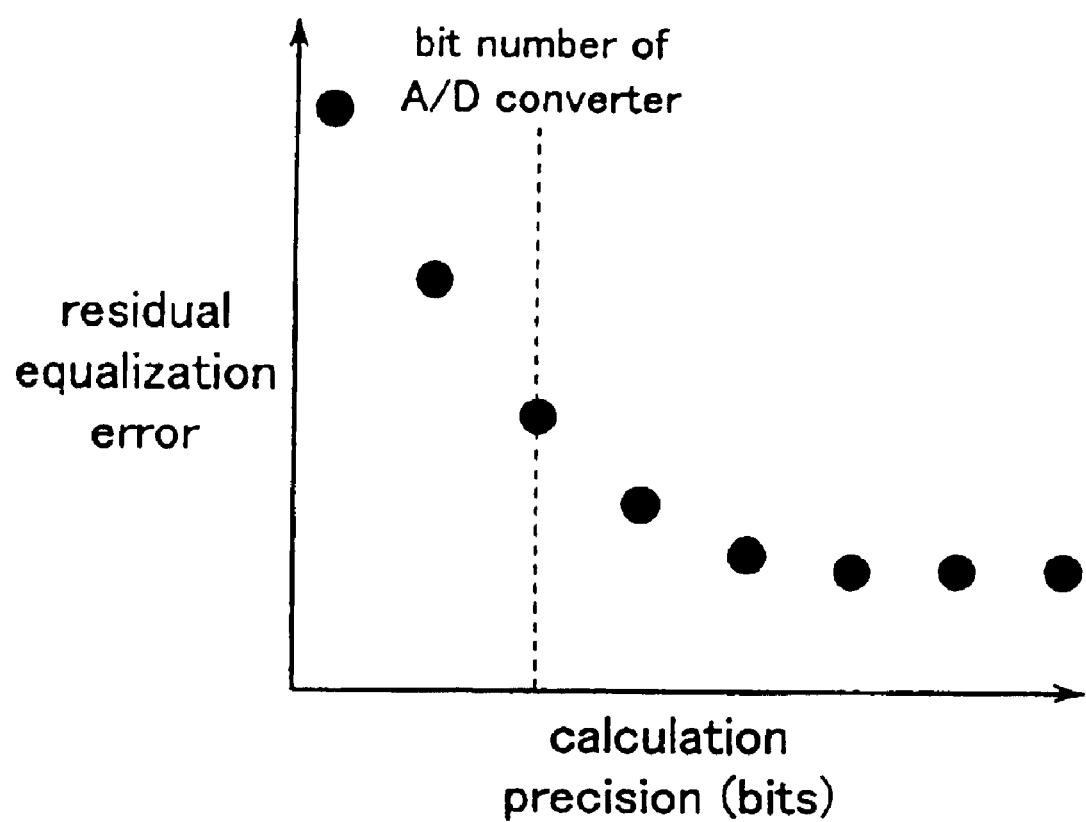
FIG. 11 shows the residual equalization error as a function of the precision of the adaptive learning calculations in an information reproducing device in accordance with a sixth embodiment of the present invention.
Figure 12:
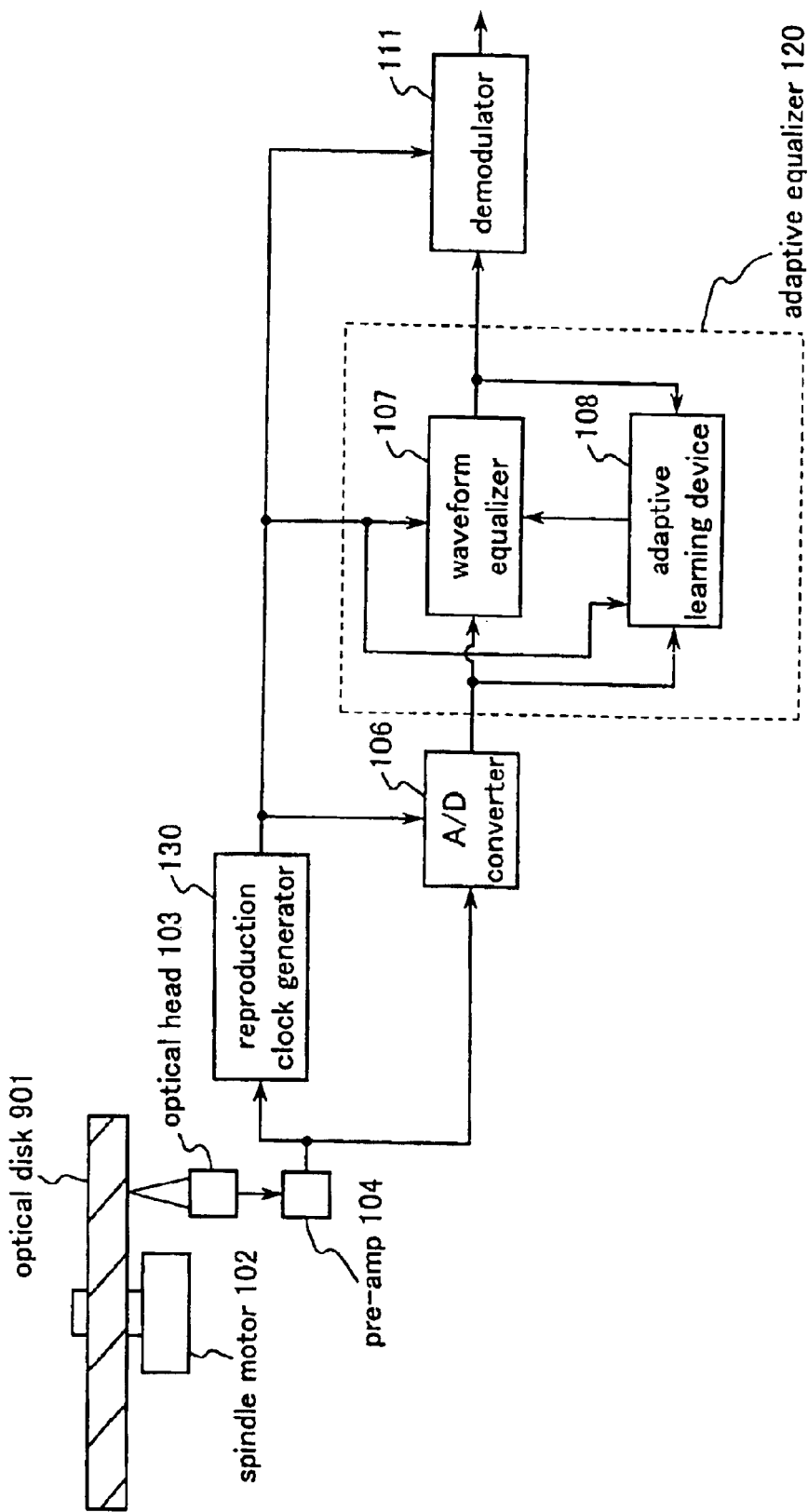
FIG. 12 is a block diagram showing the configuration of an optical disk reproducing device using conventional adaptive equalization technology.
Figure 13:
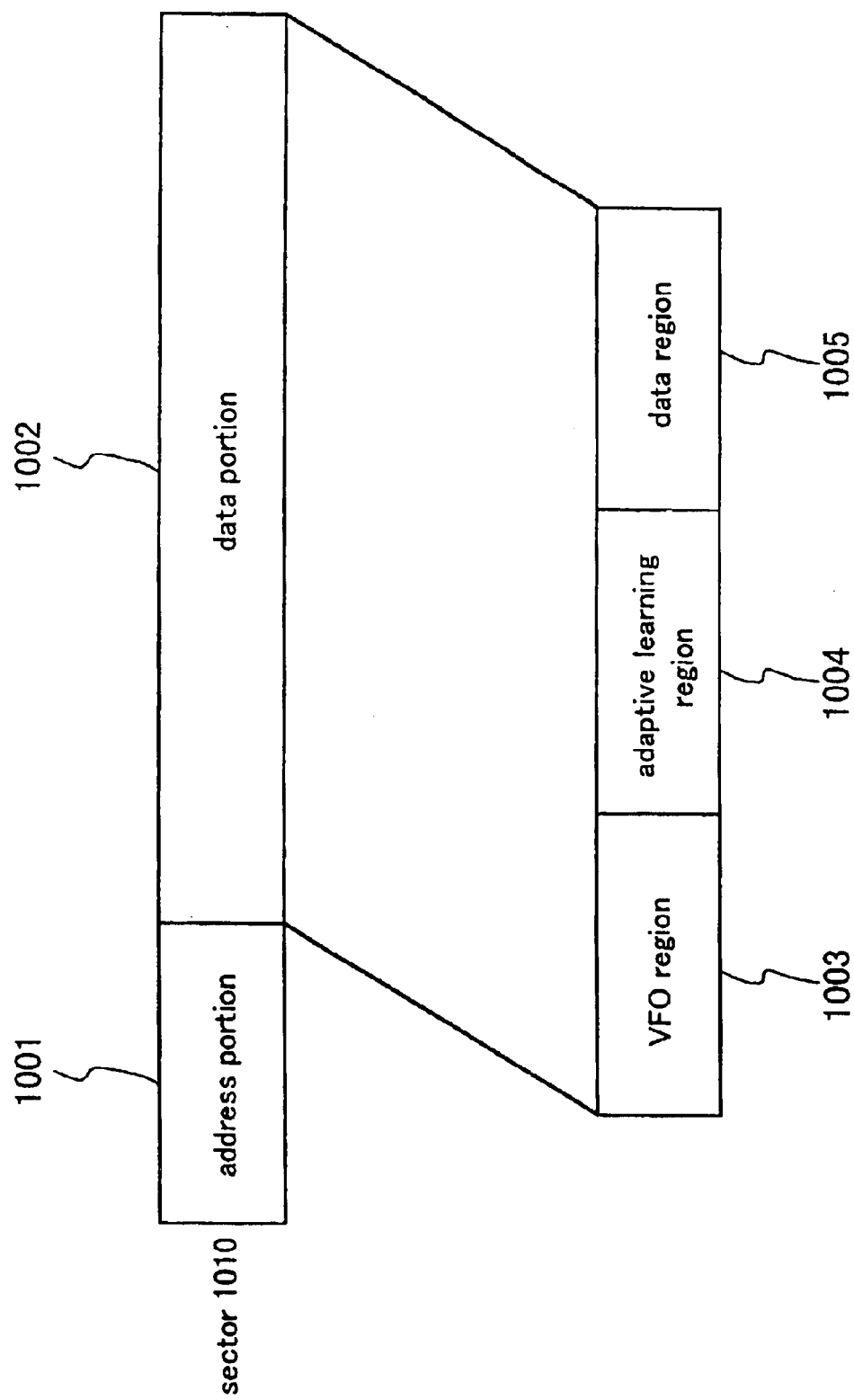
FIG. 13 is a diagram showing the sector structure of the optical disk shown in FIG. 12.
Figure 14:
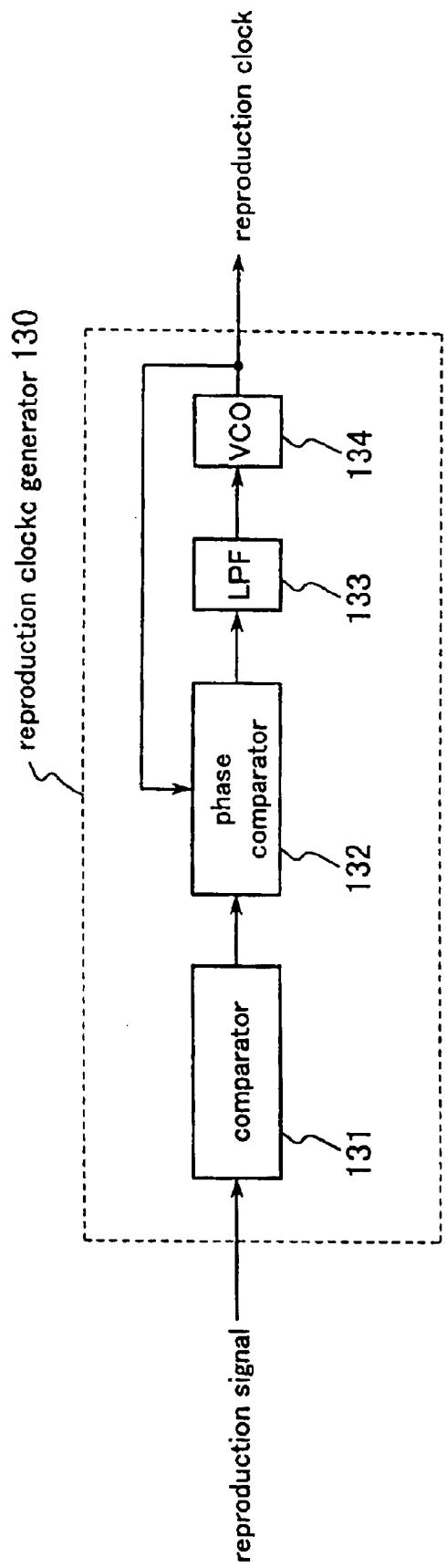
FIG. 14 is a diagram showing the sector structure of the reproduction clock generator in FIG. 12.

FIG. 11 shows the equalization error remaining when the adaptive learning operation has been finished (residual equalization error) as a function of the number of calculated bits during the adaptive learning. Since the calculation precision is fixed, a large residual equalization error remains because suitable tap coefficients are not determined, if the adaptive learning calculation is performed with less bits than the bit number at the time of A/D conversion. However, increasing the number of calculation bits makes it possible to reduce the residual equalization error.

In this embodiment, in FIG. 3 used for the first embodiment, the number of bits of the input/output signal of the waveform equalizer 107 is a fixed value that is determined by the number of output bits of the AID converter 106. For example, if A/D conversion is performed with 8 bits, the input/output signal of the waveform equalizer 107 also can be expressed by 8 bits.

Also the input/output signal of the adaptive learning device 108 becomes 8-bit data, but in its internal calculation processes, the coefficients are calculated after multiplying the input signal with a predetermined value. As a result, the tap coefficients become larger than the bit number of the tap coefficient circuits 303, 304, and 305 of the waveform equalizer 107, so that the waveform equalizer 107 is set to these tap coefficients after dividing them by a predetermined number.

For example, the tap coefficients are calculated after multiplying the 8 bit input signal with 256, and the tap coefficient circuits 303, 304 and 305 are set to values where the result has been divided down to 8 bits. In this case, the internal calculation of the coefficient calculation device 310 is performed with a fixed precision with respect to the 16 bit data.

Thus, this embodiment performs high precision calculations only inside the adaptive learning device performing the calculation of the adaptation algorithm, so that it becomes possible to perform stable adaptive learning operations without a need to scale up the size of the device.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An information reproduction method for reproducing digital signals with a reproduction head from an information recording medium, the method comprising:

waveform-equalizing a reproduction signal with a waveform equalizer;

performing an adaptive learning operation of renewing equalization properties of the waveform equalizer with an adaptive learning device, using an adaptation algorithm that performs calculation after multiplying an input signal of the waveform equalizer with a predetermined value, and sets a result of the calculation to the waveform equalizer after dividing the result of the calculation by a predetermined number; and demodulating an output of the waveform equalizer with a demodulator.

2. An information reproducing device for reproducing digital signals with a reproduction head from an information recording medium, the device comprising:

a waveform equalizer for waveform-equalizing a reproduction signal;

an adaptive learning device for performing an adaptive learning operation of renewing equalization properties of the waveform equalizer using an adaptation algorithm, that performs caluculation after multiplying an input signal of the waveform equalizer with a predetermined value, and sets a result of the calculation to the waveform equalizer after dividing the result of the calculation by a predetermined number; and a demodulator for demodulating an output of the waveform equalizer.

* * * * *